March 3, 1936. J. GARLICK 2,032,873
PNEUMATIC SHOCK ABSORBING VEHICLE FRAME
Filed July 25, 1935 2 Sheets-Sheet 1
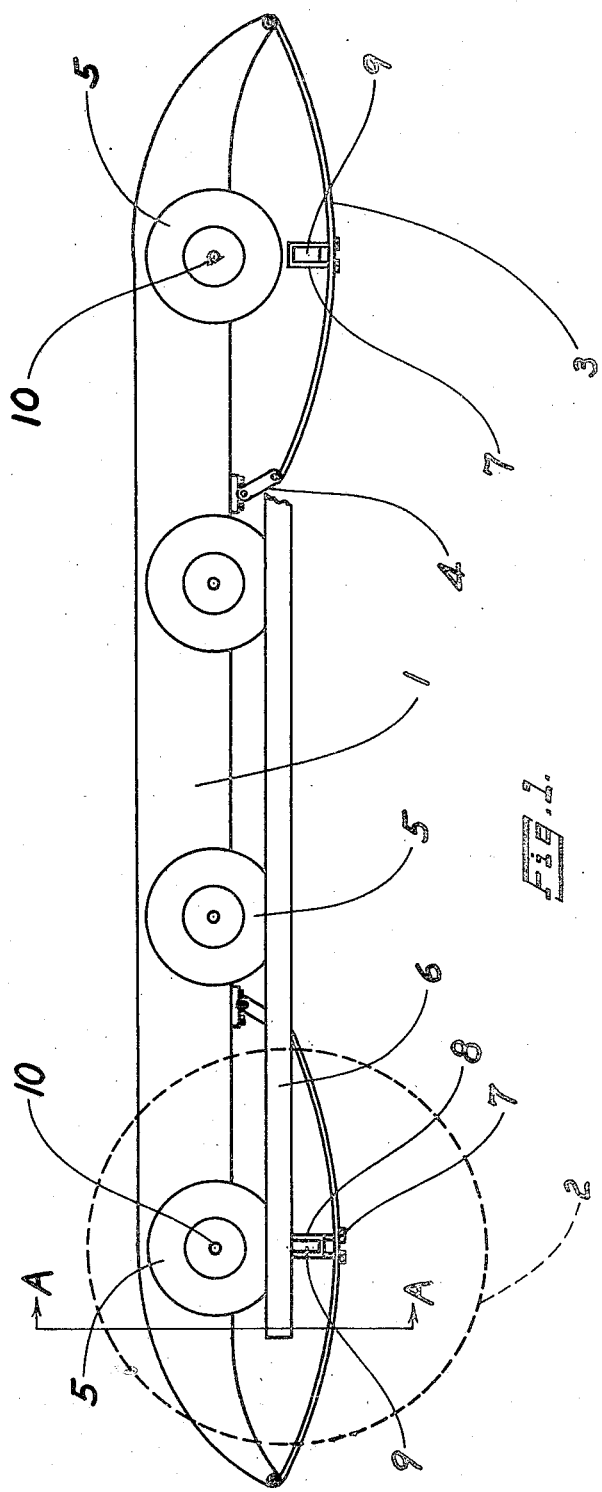
JEW GARLICK.
INVENTOR
BY M.H. Young.
ATTORNEY March 3, 1936. J. GARLICK 2,032,873
PNEUMATIC SHOCK ABSORBING VEHICLE FRAME
Filed July 25, 1935 2 Sheets-Sheet 2
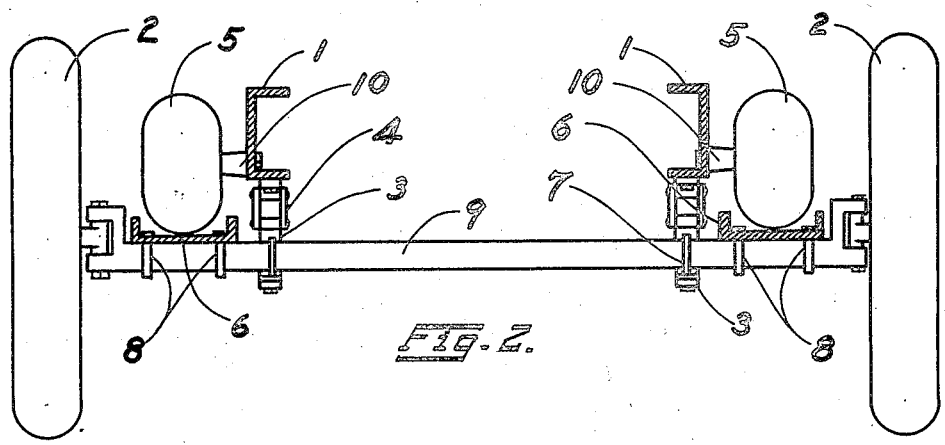
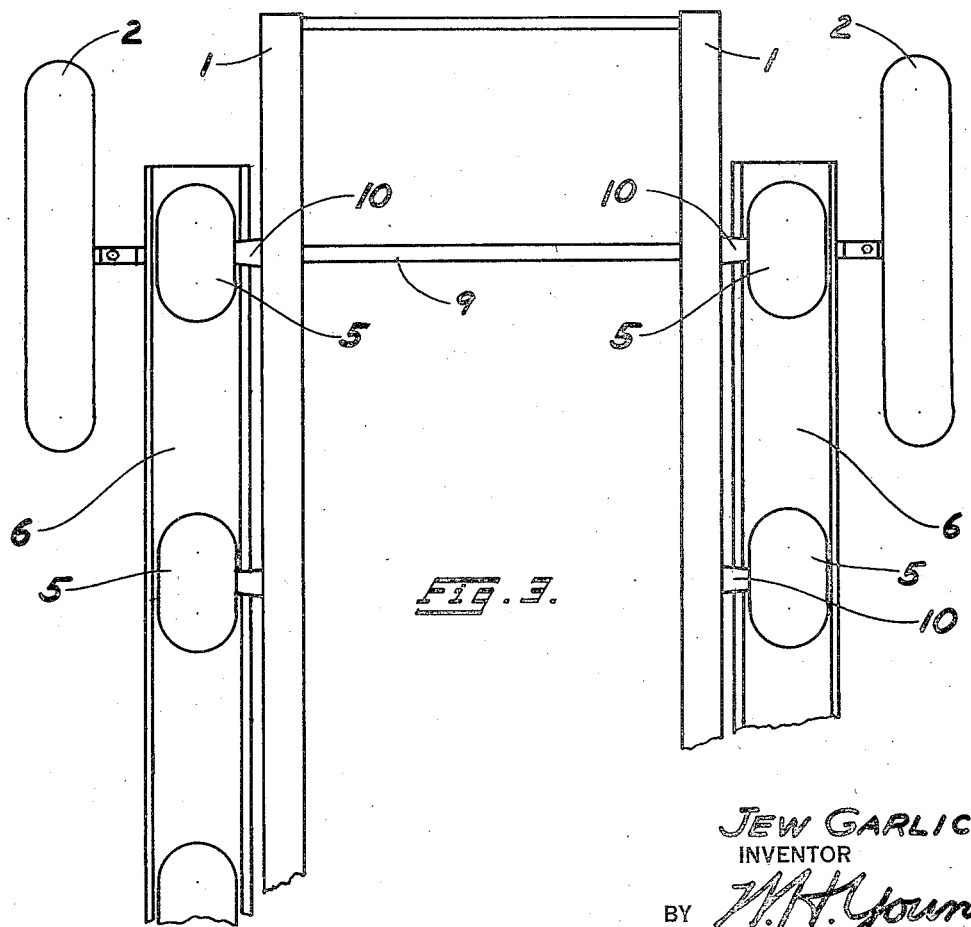
JEW GARLICK.
INVENTOR
BY *H. H. Young*
ATTORNEY Patented Mar. 3, 1936

2,032,873

UNITED STATES PATENT OFFICE 2,032,873

PNEUMATIC SHOCK ABSORBING VEHICLE FRAME

Jew Garlick, Paterson, N. J., assignor of forty per cent to Richard Furlong, Paterson, N. J.

Application July 25, 1935, Serial No. 32,980

5 Claims. (Cl. 280—106.5)

Pneumatic shock absorbers of the piston type as well as those employing irregularly shaped rubber air bags contained within collapsible semirigid outer supporting frames, have been used with some degree of success. In the piston type the advantages from riding on an air cushion are greatly reduced due to the lack of free expansion or contraction of the air chamber as a result of the fixed coordinate mechanical piston operation. Those employing a rubber air bag contained within a collapsible mechanical frame give superior riding qualities over the piston type due to the more flexible mechanical action and the greater freedom of expansion and contraction of the confined air chamber. The main disadvantage of the irregular rubber bag type cushion chamber is the cost of manufacturing and secondly the poor wearing qualities.

To overcome the above mentioned disadvantages and yet provide a vehicle frame construction employing low pressure air cushion shock absorbing elements, I propose to use a series of torus shaped air cushion chambers located between the main body supporting frame and a sub-frame attached to the traction wheels. By employing a standard low pressure balloon tire the desired torus shaped air chamber can be obtained without difficulty. Therefore a cheap air cushion chamber is readily available, having ample strength without requiring the usual collapsible supporting frame surrounding the air bag. Further the pressure maintained in such air cushion chambers can be readily changed to meet all combinations of load and road conditions.

Another advantage gained by employing the construction herein proposed, is that the air cushion chambers or low pressure tires, rotate on their respective axles free of the sub-frame whereby the tangential point of contact of the air cushion on the sub-frame is constantly changing. By this feature the wear on the low pressure tire is made uniform about its entire periphery and therefore increases the life of the air cushion. Other objects and advantages of the proposed construction will be hereinafter disclosed.

The structure is fully explained in the following description in conjunction with the accompanying drawings, wherein:

Fig. 1 is a side elevation illustrating the chassis frame structure employing four air cushion chambers on each side.

Fig. 2 is a front elevation on line AA of Fig. 1.

Fig. 3 is a plan view of the left portion of Fig. 1.

The chassis illustrated in Fig. 1 and in part in Figs. 2 and 3, employs traction or road wheels 2 attached to an axle 9. The sub-frame 6 illustrated is a channel iron which is fastened to the axle 9 by means of U bolts 8. The channel iron 6 provides a track or runway for the torus shaped air cushions 5 which are rotatively fastened through their respective axles 10 to the main frame 1.

The springs 3 are rigidly fastened to the axles 9 by means of U bolts 7; one end of the spring 3 is pinned to the main frame 1 and the other end is fastened thereto by a spring shackle 4. The purpose of the spring 3, besides any cushioning action it may have, is mainly to provide a strut between the main frame 1 and the sub-frame 6 in transmitting the forces exerted against the traction or road wheels 2 to the body load. Another purpose is to provide a semi-rigid linkage between the main frame 1 and the sub-frame 9 whereby the air cushions 5 are held in their normal position in the channel tract provided by sub-frame 6.

In considering one of the purposes of the construction namely the rotation of the torus air cushions 5 about their respective axles 10 to provide uniform peripheral wear, the action can be better understood by referring to the left hand portion of the drawings, embodying the spring 3 of Fig. 1. If the traction or road wheel 2 strikes an obstruction in the road when the vehicle is moving forward, the force will compress the spring 3 from a normally convex downward position as shown, to, for example, a straight or horizontal line. Under such stress the axle 9 and sub-frame 6 Fig. 1 will move to the right in relation to the main frame 1; such a motion of the sub-frame in contact with the air cushion 5 would rotate the air cushion 5 in a counter-clockwise direction. After the force has spent itself and the spring 3 is returning on the rebound, the air cushion 5 will be rotated in a clockwise direction. If the force of the rebound is sufficient to throw the sub-frame 6 below its normal position as shown in Fig. 1 thereby leaving the air cushion 5 free of contact with the said sub-frame, the cushion chamber will continue to rotate in its clockwise direction until the sub-frame returns from its extreme rebound point and comes against the air cushions. Under such circumstances as pointed out above the tangential point of contact between the air cushion 5 and sub-frame 6 will frequently change and distribute the air cushion wear uniformly about it entire peripheral surface.

Although I have illustrated an automobile frame employing four air cushions on each side I do not intend to confine the scope of my invention to any particular types of vehicles nor any specific number of air cushion chambers. Further, as illustrated the torus shaped air cushion chambers have their axles mounted on the main body supporting frame and their periphery supported by the sub-frame. By taking into account the weight of the air chambers and mountings, it may be desirable under certain conditions to mount the said chambers on the sub-frame and have the peripheral surface support and bear upon the main frame. Summarily this could be accomplished by merely inverting the frame shown on the traction wheels and axles without varying from the scope of the invention.

I claim:

1. A vehicle chassis including a main, body supporting frame, a sub-frame fastened to the traction wheel axles, a plurality of torus shaped air cushion chambers rotatively fastened at the axis to the body supporting frame and supported at the periphery by the sub-frame, and springs connecting the main and sub-frames working in conjunction with the air cushions for resiliently supporting the main frame above the sub-frame.

2. A vehicle chassis comprising a main, body supporting frame, a plurality of torus shaped air cushion chambers rotatively mounted along each side of said main frame, a sub-frame comprising a track extending along each side of said main frame and adapted to support as a runway a plurality of said air cushions.

3. A vehicle chassis comprising a main, body supporting frame, a sub-frame attached to the traction wheel axles, torus shaped air cushion chambers rotatively mounted on said main frame and supported at the periphery on said sub-frame, and a spring strut connecting said main and sub-frames for flexibly communicating the traction wheel longitudinal motion to the main body supporting frame.

4. A vehicle chassis comprising a main, body supporting frame, a sub-frame attached to the traction wheel axles, torus shaped air cushion chambers rotatively mounted on said main frame and supported at the periphery on said sub-frame, a spring connecting the main frame and sub-frame whereby the main frame and sub-frame may be vertically displaced to cause the periphery of the said air cushion chamber to move out of contact with the said sub-frame and permit the said chamber to rotate independently on its main frame mounting.

5. A vehicle chassis comprising a main, body supporting frame, a sub-frame attached to the traction wheel axles, torus shaped air cushion chambers rotatively mounted on said main frame and supported at the periphery on said sub-frame, means for flexibly connecting the main frame and sub-frame together whereby the combined vertical and lateral motion of the said frames in relation to each other causes the said chambers to rotate freely on their main frame mountings out of contact with the sub-frame.

JEW GARLICK.